United States Patent [19]

Hakotani et al.

[11] Patent Number: 5,004,715
[45] Date of Patent: Apr. 2, 1991

[54] DIELECTRIC CERAMIC COMPOSITION AND A MULTILAYER CERAMIC CAPACITOR AND A METHOD OF MANUFACTURING A MULTILAYER CERAMIC CAPACITOR

[75] Inventors: Yasuhiko Hakotani, Nishinomiya; Seiichi Nakatani, Hirakata; Satoru Yuuhaku, Osaka; Tsutomu Nishimura, Uji; Toru Ishida, Hirakata, all of Japan

[73] Assignee: Matsushita Electric Industrial Co., Ltd., Osaka, Japan

[21] Appl. No.: 483,462

[22] Filed: Feb. 22, 1990

[30] Foreign Application Priority Data

Feb. 23, 1989 [JP] Japan ................................ 1-43701

[51] Int. Cl.$^5$ ............................................ C04B 35/46
[52] U.S. Cl. ................................... 501/136; 501/134
[58] Field of Search ..................... 501/134, 135, 136; 252/62.3 R; 361/321

[56] References Cited

U.S. PATENT DOCUMENTS

| | | | |
|---|---|---|---|
| 3,902,102 | 8/1975 | Burn | 317/258 |
| 4,115,493 | 9/1978 | Sakabe et al. | 264/61 |
| 4,450,240 | 5/1984 | Miyamoto et al. | 501/136 |
| 4,751,209 | 6/1988 | Yokotani et al. | 501/38 |
| 4,752,858 | 6/1988 | Yokotani et al. | 361/321 |
| 4,753,905 | 6/1988 | Nishioka et al. | 501/136 |
| 4,806,511 | 2/1989 | Hayashi | 501/135 |
| 4,882,652 | 11/1989 | Furukawa et al. | 361/321 |

FOREIGN PATENT DOCUMENTS 63-265412 11/1988 Japan .

Primary Examiner—William R. Dixon, Jr.
Assistant Examiner—Chris Gallo
Attorney, Agent, or Firm—Wenderoth, Lind & Ponack

[57] ABSTRACT

A low temperature sintering dielectric ceramic composition, which exhibits high dielectric constant, low dielectric loss, high electrical resistivity, high mechanical strength and narrow grain size distribution, is disclosed. The ceramic composition is a binary system comprising lead magnesium niobate ($Pb(Mg_{\frac{1}{3}}Nb_{\frac{2}{3}})O_3$) and copper oxide, or a ternary system comprising lead magnesium niobate ($Pb(Mg_{\frac{1}{3}}Nb_{\frac{2}{3}})O_3$), lead titanate ($PbTiO_3$) and copper oxide. A multilayer ceramic capacitor comprising internal copper electrodes and ceramic dielectric layers consisting of the dielectric ceramic composition is also disclosed. A method of readily manufacturing the multilayer ceramic capacitor with copper internal electrodes is also disclosed.

This fabrication method comprises a stop of forming a multilayer laminate by the green tape multilayer laminating method using dielectric ceramic tapes and a conductor paste containing CuO as its main component; a step of heat-treatment for decomposing and removing organic binder in air (binder removing process); a step of reducing CuO in the internal electrode layers to copper by heat-treatment in a mixed gas atmosphere of nitrogen and hydrogen (reduction process); and a step of sintering the multilayer laminate in a nitrogen atmosphere (sintering process).

6 Claims, 2 Drawing Sheets

DIELECTRIC CERAMIC COMPOSITION AND A MULTILAYER CERAMIC CAPACITOR AND A METHOD OF MANUFACTURING A MULTILAYER CERAMIC CAPACITOR

BACKGROUND OF THE INVENTION

1. Field of the Invention

This invention relates to a dielectric ceramic composition, a multi-layer ceramic capacitor with internal copper electrodes and a method of manufacturing a multi-layer ceramic capacitor with internal copper electrodes.

2. Description of the Prior Art

Recently, multi-layer ceramic capacitors have been widely used in the field of microelectronics and hybrid circuitry due to its compactness, large capacitance and high reliability.

In the manufacture of multi-layer ceramic capacitors, the dielectric ceramic body and internal electrodes are cofired. Conventional multi-layer ceramic capacitors have used barium titanate ($BaTiO_3$) based materials as the dielectric. Since these materials should be fired at high temperature, e.g. 1300° C. in an oxidizing atmosphere, the internal electrodes are necessary to be made of noble metals such as platinum (Pt) and palladium (Pd) which are expensive. The high cost of the internal electrode materials has resulted in substantial increase in the manufacturing cost of multi-layer ceramic capacitors.

Therefore, there have been two demands for the dielectric materials for multi-layer ceramic capacitors. One demand is that the dielectric material can be sintered at a low temperature below 1100° C. for enabling the use of less expensive metals such as silver-palladium alloys for internal electrodes. The other demand is that the dielectric material can be sintered in a reducing atmosphere and shows high resistivity for enabling the use of base metals such as nickel or copper.

U.S. Pat. No. 4,115,493 discloses a non-reducing $BaTiO_3$ based dielectric ceramic composition and a multi-layer ceramic capacitor with internal nickel electrodes using the composition. The dielectric composition [$(Ba_{1-x}Ca_x)O_m(Ti_{1-y}Z_y)O_z$] can be sintered at a temperature range of 1300° to 1400° C. in an atmosphere of low oxygen content and shows high electrical resistivity.

U.S. Pat. No. 4,450,240 discloses a low-firing dielectric ceramic composition of $PbTiO_3$-$Pb(Ni_{\frac{1}{2}}Nb_{\frac{1}{2}})O_3$-$Pb(Mg_{\frac{1}{2}}W_{\frac{1}{2}})O_3$ and a multi-layer ceramic capacitor employing the composition. Since the composition can be sintered at a temperature range of 900° to 1050° C. in an oxidizing atmosphere, silver-palladium alloys can be used as the internal electrodes of the multi-layer ceramic capacitor. Copper can not be used for the internal electrodes of the multi-layer ceramic capacitor employing this ceramic composition because the composition can not be sintered in a reducing atmosphere. Copper is the ideal electrode material due to its high conductivity, high migration resistance and low cost.

U.S. Pat. No. 4,751,209 discloses a dielectric ceramic composition of $PbTiO_3$-$Pb(Mg_{\frac{1}{3}}Nb_{\frac{2}{3}})O_3$-$Pb(Ni_{\frac{1}{2}}W_{\frac{1}{2}})O_3$ ternary system and a multi-layer ceramic capacitor using the composition. The composition can be sintered at a temperature below 1080° C. and in an atmosphere of low oxygen content, which enables to manufacture a multi-layer ceramic capacitor with internal copper electrodes.

Japanese patent application laid-open No. 63-265412 discloses a multi-layer ceramic capacitor using low temperature sintering dielectric ceramic compositions and internal copper electrodes. The compositions include an oxide containing a component A and a component B and copper. The component A is selected from lead (Pb), calcium (Ca), strontium (Sr) and barium (Ba). The component B is selected from magnesium (Mg), nickel (Ni), titanium (Ti), zinc (Zn), niobium (Nb), and tungsten (W). The lead based perovskite materials have firing temperatures lower than the copper melting point, and high resistivity when fired in an oxygen deficient atmosphere.

As shown in some examples, some dielectric compositions containing lead can be sintered at a temperature below the melting point of copper in a low oxygen partial pressure atmosphere without showing a drop of the resistivity. Multi-layer ceramic capacitors made of these dielectric materials and internal copper electrodes exhibit large capacitances, high resistivities and low dielectric losses.

But there have been problems in the use of these materials. The first problem is the limitation of the sintering atmosphere. The above-mentioned dielectric materials must be sintered in an atmosphere in which oxygen partial pressure is precisely controlled at a range of $1 \times 10^{-10}$ to $1 \times 10^{-7}$ atm using a gas mixture, e.g. a mixture of hydrogen gas and nitrogen gas.

The second problem is the low mechanical strength of the sintered ceramic body. The above-mentioned perovskite dielectric materials containing lead have much smaller mechanical strength, e.g. 800 to 900 $kg/cm^2$, in comparison with $BaTiO_3$ based materials, e.g. 1300 $kg/cm^2$. The low mechanical strength of the multi-layer ceramic capacitor body results in the problem when the chip capacitors are automatically mounted on the substrate using a chip-mounter.

The third problem is the wide grain size distribution of the sintered material. Specifically abnormal grain growth, e.g. $>10$ $\mu m$, makes it difficult to decrease the thickness of the dielectric layers in the multi-layer ceramic capacitor due to the drop of the electrical resistivity of the layers.

Meanwhile, as described earlier, in the manufacture of multi-layer ceramic capacitors, the dielectric ceramic layers and the internal electrode layers are cofired. As the organic binder contained in the dielectric green tapes prevents the ceramic body from sintering densely, the organic components should be removed completely in the binder burn-out process. When base metals are employed as internal electrodes of multi-layer ceramic capacitors, perfect removal of the organic binder is very difficult.

U.S. Pat. No. 3,902,102 discloses a fabrication process of a multi-layer ceramic capacitor whose internal electrodes are base metals. After electrode ink, containing particles of base metal, a glass frit and an organic binder ethyl cellulose, is applied on the dielectric, the green ceramic body is subsequently "post" fired in an atmosphere of low oxygen partial pressure at about 900° C. After the binder burn-out step, sintering is carried out in an atmosphere, in which oxygen partial pressure is delicately controlled using $CO_2$-CO mixture.

U.S. Pat. No. 4,752,858 discloses a fabrication method of a multi-layer ceramic capacitor whose internal electrodes are made of copper or an alloy principally containing copper. In the method, acrylic resin is used as binder to prepare both ceramic green tapes and electrode paste. After printing electrodes, laminating the tapes and cutting, the binder burn-out process takes place in 1% $O_2$-$N_2$ gas (a mixture of 1% oxygen gas and 99% nitrogen gas) at a temperature of 350° C. Sintering procedure is performed using alumina tube furnace supplied with $N_2$-$H_2$ gas (a mixture of nitrogen gas and hydrogen gas).

In the conventional fabrication methods of a multi-layer ceramic capacitor with base metal internal electrodes, since organic binders used for dielectric green tapes and electrode paste have properties of nondecomposition in a non-oxidizing atmosphere, it is very difficult to achieve the complete binder removal in an oxygen deficient atmosphere.

SUMMARY OF THE INVENTION

It is an object of this invention to provide a dielectric ceramic composition which can be sintered at a temperature below 1000° C. in an low oxygen particle pressure atmosphere, and has high dielectric constant, low dielectric loss, high mechanical strength and narrow grain size distribution.

It is another object of this invention to provide a multi-layer ceramic capacitor which has high reliability, high specific resistivity, high mechanical strength and high brake down voltage, and which has internal copper electrodes.

It is still another object of this invention to provide a method of readily and inexpensively manufacturing a multi-layer ceramic capacitor with internal copper electrodes.

In accordance with this invention, a novel dielectric composition, a multi-layer ceramic capacitor and a method of manufacturing a multi-layer ceramic capacitor are provided which avoid all of the above-noted problems. A dielectric ceramic composition is a binary system comprising lead magnesium niobate ($Pb(Mg_{\frac{1}{3}}Nb_{\frac{2}{3}})O_3$) and copper oxide. Another dielectric ceramic composition is a ternary system comprising lead magnesium niobate ($Pb(Mg_{\frac{1}{3}}Nb_{\frac{2}{3}})O_3$), lead titanate ($PbTiO_3$) and copper oxide. A multi-layer ceramic capacitor comprises internal electrode layers consisting of copper; and ceramic dielectric layers extending between the internal electrode layers, the ceramic dielectric layers each have a ceramic composition comprising a binary system of lead magnesium niobate ($Pb(Mg_{\frac{1}{3}}Nb_{\frac{2}{3}})O_3$) and copper oxide. Another multi-layer ceramic capacitor comprises internal electrode layers consisting of copper; and ceramic dielectric layers, the ceramic dielectric layers each have a ceramic composition composing a ternary system of lead magnesium niobate ($Pb(Mg_{\frac{1}{3}}Nb_{\frac{2}{3}})O_3$), lead titanate ($PbTiO_3$) and copper oxide. A method of manufacturing a multi-layer ceramic capacitor comprises the steps of producing a multi-layer laminate by preparing a plurality of green tapes each being made of a dielectric ceramic composition comprising lead magnesium niobate ($Pb(Mg_{\frac{1}{3}}Nb_{\frac{2}{3}})O_3$) and copper oxide with addition of at least an organic binder and a plasticizer, forming on each of the plurality of green tapes a pattern of a paste containing cupric oxide (CuO) as its main component, and laminating the thus obtained green tapes; removing the organic binder in the multi-layer laminate by heating the multi-layer laminate in air at a temperature at which the organic binder is decomposed and scattered; reducing cupric oxide (CuO) to copper (Cu) by heating the multi-layer laminate in a mixed gas atmosphere of hydrogen and nitrogen at a temperature within a range in which cupric oxide is reduced but dielectric is not reduced; and sintering the multi-layer laminate in a nitrogen atmosphere. Another method of manufacturing a multi-layer ceramic capacitor comprises the steps of producing a multi-layer laminate by preparing a plurality of green tapes each being made of a dielectric ceramic composition comprising lead magnesium niobate ($Pb(Mg_{\frac{1}{3}}Nb_{\frac{2}{3}})O_3$), lead titanate ($PbTiO_3$) and copper oxide with addition of at least an organic binder and a plasticizer, forming on each of the plurality of green tapes a pattern of a paste containing cupric oxide (CuO) as its main component, and laminating the thus obtained green tapes; removing the organic binder in the multi-layer laminate by heating the multi-layer laminate in air at a temperature at which the organic binder is decomposed and scattered; reducing cupric oxide (CuO) to copper (Cu) by heating the multi-layer laminate in a mixed gas atmosphere of hydrogen and nitrogen at a temperature within a range in which cupric oxide is reduced but dielectric is not reduced; and sintering the multi-layer laminate in a nitrogen atmosphere.

DESCRIPTION OF THE PREFERRED EMBODIMENTS

Dielectric Ceramic Composition

The process for preparing a dielectric ceramic composition of this invention and evaluating properties of the dielectric ceramic composition is briefly described as follows.

Figure 2:
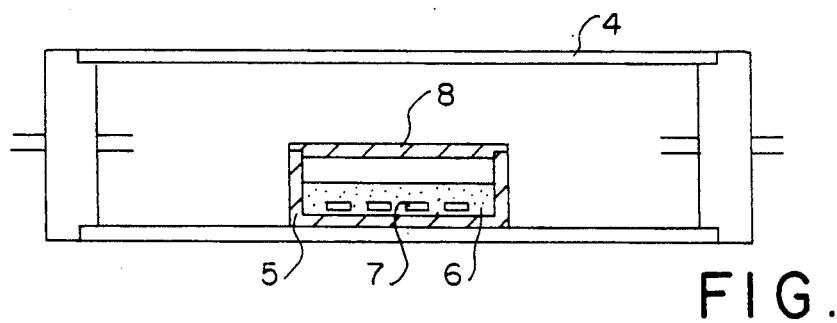
FIG. 2 is a sectional view of a tube furnace during firing.

The starting materials, viz lead oxide (PbO), magnesium oxide (MgO), niobium oxide ($Nb_2O_5$), titanium oxide ($TiO_2$) and cupric oxide (CuO), all relatively pure grade, were initially mixed in a ball mill with distilled water and calcium oxide stabilized zirconia balls for 24 hours. Thereafter the mixture was dried and then pressed into columns, and calcined at a temperature of 800° C. for 2 hours in air. The calcined ceramic composition was wet ground in a ball mill and dried. The dielectric ceramic powder thus obtained show narrow particle size distribution and the average particle size was 0.4 $\mu$m. The particle size was measured by a centrifugal automatic particle analyzer. The ceramic powder was mixed with polyvinyl alcohol solution as a binder, and then pressed into disks of about 15 mm in diameter and about 1.5 mm in thickness under a pressure of 1000 kg/$cm^2$. The organic binder was removed by slow heating at 600° C. in air. After the binder burn-out process, sintering was performed using an alumina tube 4 in an electric furnace, shown in FIG. 2. The sample disks were put into a magnesia vessel 5. First, pre-calcined lead magnesium niobate powder 6 was spread on the bottom of the magnesia vessel 5 with about 2 mm thickness. The burned-out sample disks 7 were laid on the calcined powder 6, and still more calcined lead magnesium niobate powder 6 was put into the vessel to make the disks 7 covered with the calcined power to prevent volatilization of PbO during firing. Then a magnesia lid 8 was put on the vessel 5. This magnesia vessel 5 containing the disks 7 was inserted into an alumina tube 4 in a furnace. After the air in the alumina tube 4 was exhausted by a rotary pump, $N_2$ gas was flowed into the tube 4. The alumina tube 4 was heated to a preset temperature at a rate of 300° C./hr, and maintained at the temperature for 2 hours, and then cooled at a rate of 300° C./hr to room temperature. The preset temperature was chosen from a temperature range 850° C. to 1100° C. The oxygen concentration in the firing atmosphere was 1-10 ppm.

The sintered samples were measured for densities by liquid displacement method using water as the medium. After measuring the densities, the sintered disks were ground to a thickness of 1 mm and indium-gallium (In-Ga) alloy electrodes were applied on both surfaces of the disks to make disk capacitors. Electrical properties of the disk capacitors were obtained in the following way. Dielectric constant ($\epsilon$) and dielectric loss (tan $\delta$) were measured using a LCR meter at 1 KHz with 1 Vrms. Specific resistivity of the sample was measured using a high resistance meter, 1 minute after applying 50 VDC.

The test pieces for measuring the mechanical strength of the sintered ceramic compositions were prepared in the same way as the sintered disks. The dimensions of the test piece were 40.0mm ×4.0mm ×3.0mm. The bending strength of the test piece was measured by a 3-point bending test method, using an INSTRON strength tester.

EXAMPLE 1

The properties of a dielectric ceramic composition comprising lead magnesium niobate and copper oxide are shown in TABLE 1. In TABLE 1, the samples denoted by the numerals with the character * relate to this invention. The samples denoted by the numerals without the character * do not relate to this invention and are references for the comparison with the compositions of this invention.

From TABLE 1, it is obvious that a dielectric ceramic composition of this invention, which comprises lead magnesium niobate in an amount of 75.0 to 97.0 mol %, and copper oxide in an amount of 3.0 to 25.0 mol % in terms of cupric oxide (CuO), can be sintered densely in an atmosphere of low oxygen content, exhibiting high dielectric constant ($\epsilon$=9940 to 11280), high electric resistivity up to $10^{12}$ Ω·cm, low dielectric loss and high mechanical strength and narrow grain size distribution. Particularly, the oxygen partial pressure of the firing atmosphere is $1.0 \times 10^{-5}$ to $1.0 \times 10^{-6}$ atm, and the firing atmosphere can be easily set using a commercial nitrogen gas (oxygen concentration 1-40 ppm). When the composition contains CuO less than 3 mol %, the sintered ceramic does not show high mechanical strength. On the other hand, for the ceramic composition containing CuO more than 25 mol %, as the CuO content increases, large increase in dielectric loss as well as decrease in mechanical strength occur, so that the compositions are not suited for practical use.

The fracture surfaces of the sintered samples were observed using a scanning electron microscope. The grain size of a sintered ceramic containing cupric oxide more than and equal to 3.0 mol % was 3-4 μm, and the grain size distribution of the sample was narrow and no abnormal grain growth was observed. A sintered ceramic containing cupric oxide less than 3.0 mol % showed abnormal grain growth, e.g. grain size > 15 μm, and grain size of the sample was 2.0-4.0 μm.

EXAMPLE 2

The properties of a dielectric ceramic composition comprising lead magnesium niobate, lead titanate, and copper oxide are shown in TABLE 2. In TABLE 2, the samples denoted by the numerals with the character * relate to this invention. The samples denoted by the numerals without the character * do not relate to this invention and are references for the comparison with the compositions of this invention.

From TABLE 2, it is obvious that a dielectric ceramic composition of this invention, which comprises lead magnesium niobate in an amount of 60.0 to 97.0 mol %, and lead titanate in an amount of 0.0 to 15.0 mol %, and copper oxide in an amount of 3.0 to 25.0 mol % in terms of cupric oxide (CuO), can be sintered densely in an atmosphere of low oxygen content, exhibiting high dielectric constant ($\epsilon$=7670 to 13020), high electric resistivity up to $5 \times 10^{11}$ Ω·cm, low dielectric loss and high mechanical strength and narrow grain size distribution. Particularly, the oxygen partial pressure of the firing atmosphere is $1.0 \times 10^{-5}$ to $1.0 \times 10^{-6}$ atm, and the firing atmosphere can be easily set using a commercial nitrogen gas (oxygen concentration 1-40 ppm). When the composition contains CuO less than 3 mol %,

TABLE 1

| No. | Composition (mol %) Pb(Mg$_\frac{1}{3}$Nb$_\frac{2}{3}$)O$_3$ | CuO | Sintering temperature (°C.) | $\epsilon$ (20° C.) | tan $\delta$ (%) (20° C.) | Specific resistivity (20° C.)(Ω · cm) | Density (g · cm$^{-3}$) | Bending strength (kg · cm$^{-2}$) | Grain size (μm) |
|---|---|---|---|---|---|---|---|---|---|
| 1 | 99.9 | 0.1 | 1100 | 8450 | 1.78 | 6.79 × 10$^{11}$ | 8.037 | 880 | 2.0-3.0 , **A.G.G. (>15 μm) |
| 2 | 99.0 | 1.0 | 1000 | 10160 | 1.33 | 1.94 × 10$^{12}$ | 8.015 | 890 | 2.0-3.5 , **A.G.G. |
| 3 | 97.5 | 2.5 | 975 | 10910 | 1.47 | 1.38 × 10$^{12}$ | 8.031 | 970 | 2.5-4.0 , **A.G.G. |
| 4* | 97.0 | 3.0 | 975 | 11420 | 1.38 | 1.51 × 10$^{12}$ | 8.030 | 1080 | 2.5-4.0 |
| 5* | 95.0 | 5.0 | 950 | 11530 | 1.35 | 1.63 × 10$^{12}$ | 8.021 | 1150 | 3.0-4.0 |
| 6* | 85.0 | 15.0 | 950 | 11280 | 1.67 | 1.39 × 10$^{12}$ | 7.985 | 1210 | 3.0-4.0 |
| 7* | 75.0 | 25.0 | 975 | 9940 | 1.84 | 1.10 × 10$^{12}$ | 7.909 | 1170 | 3.0-4.0 |
| 8 | 70.0 | 30.0 | 975 | 8290 | 3.81 | 6.00 × 10$^{11}$ | 7.711 | 990 | 3.0-4.0 |
| 9 | 60.0 | 40.0 | 975 | 5120 | 5.33 | 1.25 × 10$^{11}$ | 7.653 | 770 | 3.0-4.0 |

**A.G.G. means Abnormal Grain Growth.

the sintered ceramic does not show high mechanical strength. On the other hand, for the ceramic composition containing CuO more than 25 mol %, as the CuO content increases, large increase in dielectric loss as well as decrease in mechanical strength occur, so that the compositions are not suited for practical use.

Adding lead titanate in an amount less than or equal to 15 mol % to a binary system of lead magnesium niobate and copper oxide causes the shift of the Curie temperature of the material to higher temperature, which results in the increase of the dielectric constant at room temperature in comparison with that of the composition without lead titanate. When the lead titanate content increases up to 15 mol % in the composition, dielectric constant decreases and dielectric loss increases at room temperature. The gain size of the sintered ceramic of this invention is 3–4 μm, and no abnormal grain growth was observed. Sintered ceramic compositions containing 1.0 mol % and 2.5 mol % cupric oxide showed abnormal gain growth, e.g. grain size >15 μm.

Each of the dielectric ceramic powders was prepared in the same way as that in EXAMPLE 1 and EXAMPLE 2. The mixture of PbO, MgO, $Nb_2O_5$, $TiO_2$ and CuO was calcined at a temperature of 800° C. for 3 hours in air. The calcined powder was ground in a ball mill with partially stabilized zirconia balls with diameter of 5 mm in water for 24 hours. After filtration and drying, the ceramic powder was used as an inorganic component, polyvinyl butyral as an organic binder, di-n-butyl phthalate as a plasticizer, and a mixture (in a ratio of 40 to 60) of toluene and isopropyl alcohol as a solvent, which were mixed in composition shown in TABLE 4 and slurried.

TABLE 4

| Component | Mixing Ratio | Weight |
|---|---|---|
| Inorganic Component | 100 parts | 2.0 kg |
| Polyvinyl Butyral | 10 parts | 0.2 kg |
| Di-n-Butyl Phthalate | 5 parts | 0.1 kg |
| Toluene/Isopropyl Alcohol | 40 parts | 0.8 kg |

TABLE 2

| No. | Composition (mol %) $Pb(Mg_{\frac{1}{3}}Nb_{\frac{2}{3}})O_3$ | $PbTiO_3$ | CuO | Sintering temperature (°C.) | ε (20° C.) | tan δ (%) (20° C.) | Specific resistivity (Ω cm)(20° C.) | Density (g·cm$^{-3}$) | Bending strength (kg·cm$^{-2}$) | Grain size (μm) |
|---|---|---|---|---|---|---|---|---|---|---|
| 1 | 98.0 | 1.0 | 1.0 | 1000 | 8370 | 2.02 | 8.47 × 10$^{11}$ | 8.023 | 870 | 2.0–3.5, **A.G.G. (>15 μm) |
| 2* | 93.0 | 1.0 | 6.0 | 975 | 11130 | 2.01 | 1.34 × 10$^{12}$ | 8.031 | 1090 | 3.0–4.0 |
| 3* | 89.0 | 1.0 | 10.0 | 975 | 11160 | 2.00 | 1.42 × 10$^{12}$ | 7.993 | 1240 | 3.0–4.0 |
| 4* | 74.0 | 1.0 | 25.0 | 975 | 9980 | 2.11 | 9.19 × 10$^{11}$ | 7.890 | 1140 | 3.0–4.0 |
| 5 | 69.0 | 1.0 | 30.0 | 975 | 8340 | 3.67 | 9.37 × 10$^{11}$ | 7.684 | 970 | 3.0–4.0 |
| 6 | 89.0 | 8.0 | 3.0 | 975 | 12460 | 2.26 | 1.01 × 10$^{12}$ | 7.998 | 990 | 2.0–4.5, **A.G.G. |
| 7* | 87.0 | 8.0 | 5.0 | 975 | 12870 | 2.23 | 1.35 × 10$^{12}$ | 8.013 | 1130 | 2.0–4.5 |
| 8* | 82.0 | 8.0 | 10.0 | 975 | 13020 | 2.38 | 13.8 × 10$^{12}$ | 7.950 | 1180 | 2.5–4.0 |
| 9* | 67.0 | 8.0 | 25.0 | 975 | 11340 | 2.95 | 8.93 × 10$^{11}$ | 7.885 | 890 | 3.0–4.0 |
| 10 | 52.0 | 8.0 | 40.0 | 975 | 9910 | 4.89 | 9.17 × 10$^{10}$ | 7.664 | 960 | 3.0–4.0 |
| 11 | 83.0 | 15.0 | 2.0 | 1000 | 8200 | 2.34 | 8.64 × 10$^{11}$ | 7.910 | 1080 | 2.0–4.0, **A.G.G. |
| 12* | 78.5 | 15.0 | 6.5 | 975 | 8350 | 2.31 | 9.91 × 10$^{11}$ | 7.953 | 1120 | 2.5–4.0 |
| 13* | 75.0 | 15.0 | 10.0 | 975 | 8270 | 2.22 | 1.25 × 10$^{12}$ | 7.915 | 1190 | 3.0–4.0 |
| 14* | 65.0 | 15.0 | 20.0 | 1000 | 7670 | 3.88 | 5.37 × 10$^{11}$ | 7.987 | 1030 | 3.0–4.0 |
| 15 | 55.0 | 15.0 | 30.0 | 1000 | 6550 | 5.45 | 3.25 × 10$^{10}$ | 7.629 | 980 | 2.5–4.5 |
| 16 | 78.0 | 20.0 | 2.0 | 1050 | 3540 | 3.85 | 1.33 × 10$^{11}$ | 7.711 | 1010 | 2.0–4.5 |
| 17 | 70.0 | 20.0 | 10.0 | 1050 | 3780 | 4.23 | 6.12 × 10$^{10}$ | 7.689 | 1100 | 2.0–4.5 |
| 18 | 50.0 | 20.0 | 30.0 | 1050 | 3670 | 4.99 | 6.38 × 10$^{10}$ | 7.732 | 910 | 2.0–4.5 |

**A.G.G. means Abnormal Grain Growth.

A brief description about a multi-layer ceramic capacitor and a method of manufacturing a multi-layer ceramic capacitor is given in the following.

Figure 1:
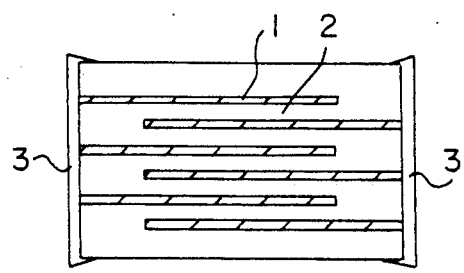
FIG. 1 is a sectional view of an embodiment of a multi-layer ceramic capacitor of this invention.

FIG. 1 shows a sectional view of a multi-layer ceramic capacitor manufactured by a method embodying this invention, in which:

Numeral 1 denotes internal electrode layers consisting of copper. Numeral 2 gives ceramic dielectric layers extending between the internal electrode layers, and 3 represents external electrodes.

EXAMPLE 3

Dielectric materials A, B, C, D and E, as shown in TABLE 3, were used for ceramic dielectrics of multi-layer ceramic capacitors.

TABLE 3

| Material | Composition (mol %) $Pb(Mg_{\frac{1}{3}}Nb_{\frac{2}{3}})O_3$ | $PbTiO_3$ | CuO |
|---|---|---|---|
| A | 98.0 | 0.0 | 2.0 |
| B* | 95.0 | 0.0 | 5.0 |
| C* | 85.0 | 5.0 | 10.0 |
| D* | 80.0 | 12.0 | 8.0 |
| E | 55.0 | 15.0 | 30.0 |

In TABLE 3, the materials denoted with the character * relate to this invention. The materials denoted without the character * do not relate to this invention.

The resulting slurry was formed into a sheet by the doctor blade method. The thickness of the ceramic green tape was 15 μm.

High purity reagent of cupric oxide (CuO) was used as the starting material for internal electrodes of the multi-layer ceramic capacitor. Cupric oxide powder was calcined at 800° C. in air for 2 hours and milled into powder with about 1.5 μm average particle size. The CuO powder and vehicle, a solution of ethyl cellulose as the organic binder in turpentine oil as the solvent, were dispersed using a roll mill to form conductive paste.

Mixing composition of this CuO paste is shown in TABLE 5.

TABLE 5

| Component | Weight % |
|---|---|
| CuO | 80.0 |
| Vehicle | |
| Solvent-turpentine oil | 17.0 |
| Organic binder-ethyl cellulose | 3.0 |

A pattern of internal electrodes was screen-printed on the dielectric green tape by use of the CuO paste.

The dielectric sheets having the printed internal electrodes patterns were laminated, and bonded by thermal compression under condition of temperature being 50° C., and pressure 120 kg/cm². Then, the laminated tapes were cut into laminated chips. The green laminate body obtained in this way was subjected to a heat treatment according to the binder burn-out method of this invention.

Figure 5:
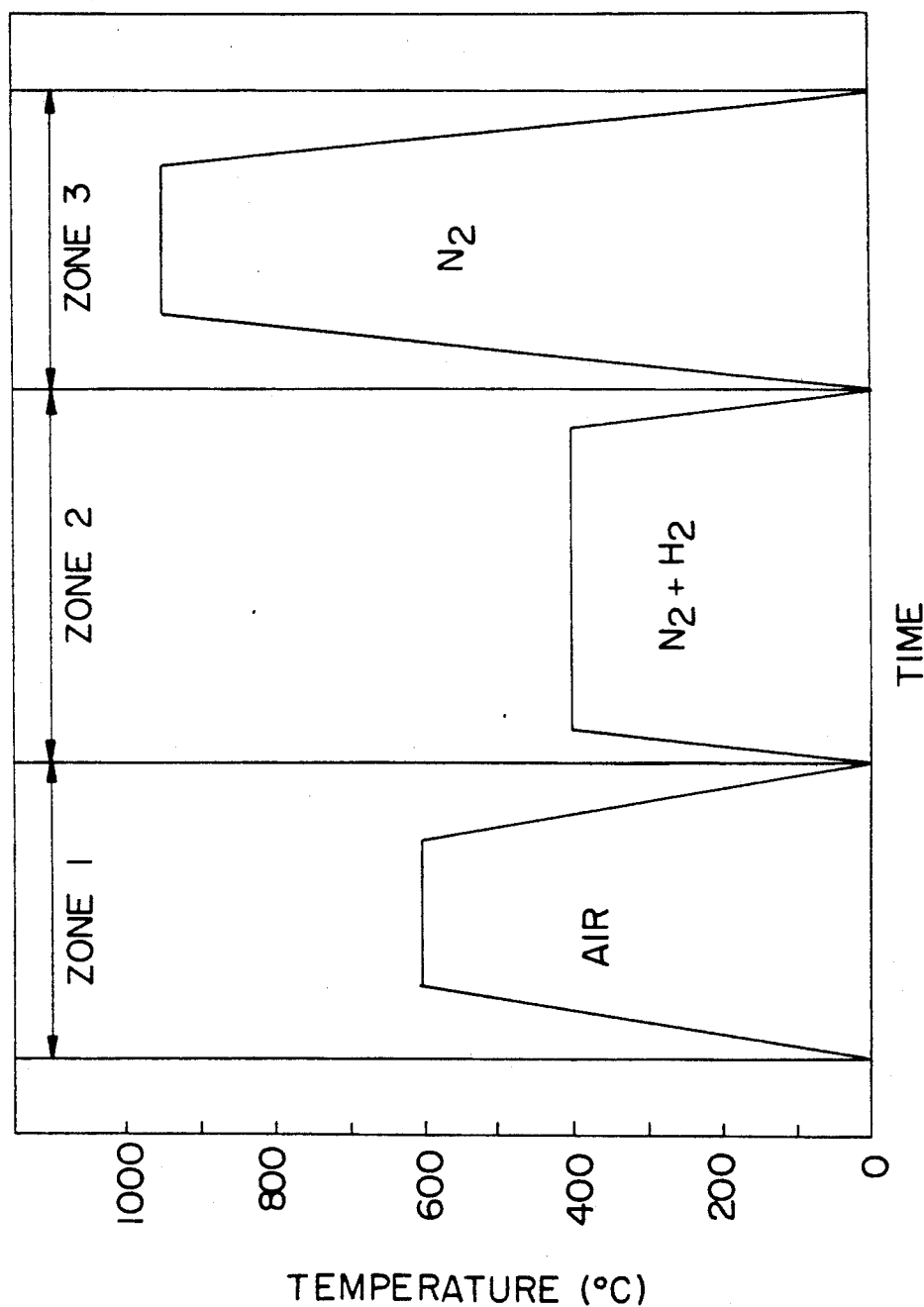
FIG. 5 is a graph exemplary of the temperature and atmosphere profile of binder removing process, reduction process, and sintering process, in the manufacturing method of this invention.

FIG. 5 shows an example of the binder removing system, in which the heat treatment of the temperature profile shown in Zone 1 was carried out in air. The organic binder in the green tapes and the organic component in the conductive paste were almost thermal-decomposed and the organic components were removed completely. The binder removing temperature and the atmosphere were set by confirming previously carrying out thermal analysis as to whether or not the binder had been completely removed. Accordingly, the decomposition temperature of a binder changes depending on the kind of binder, and thus the binder removal setting temperature was of course changed The removal of decomposition of the polyvinyl butyral binder used according to this invention was examined by analyzing the carbon left undecomposed by the heat treatment in air. The results of the analysis are described in the following. After heat-treatment at a temperature below 300° C. for 2 hours, no decomposition of the binder occurred. When heat-treated at a temperature higher than 350° C., the binder was decomposed and the carbon residue decreased as the heat-treatment temperature rised, e.g. at 400° C., approx. 1500 ppm carbon was detected; at 450° C., approx. 600 ppm carbon; at 500° C., approx. 150 ppm carbon; at 550° C., 80 ppm carbon; and at a temperature equal to and higher than 600° C., it was below 10 ppm, showing that adequate removal by decomposition has been accomplished. If the binder removing temperature is set at a temperature higher than 800° C., the ceramic dielectric layers are sintered excessively, so that CuO in the electrode layers are hardly reduced in the following reduction process. Then, the binder removing temperature should be chosen from the temperature range below 800° C. In this embodiment, the binder removal was carried out at 600° C. for 2 hours. The heating and cooling rate were 200° C./hr.

Figure 3:
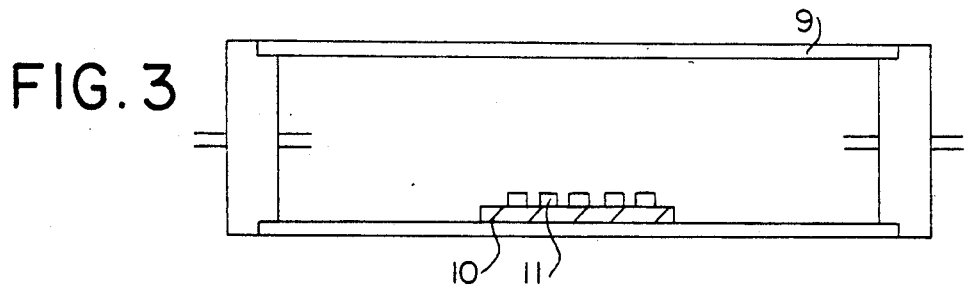
FIG. 3 is a sectional view of a tube furnace during reduction of electrode layers.

Next, this laminated chip from which binder had been removed was subjected to reduction treatment. The conditions for this are illustrated by Zone 2 in FIG. 5. This treatment was carried out using an alumina tube 9 in an electric furnace, shown in FIG. 3. The laminated chips 11 were placed on the alumina plate 10 and the plate 10 was inserted into the alumina tube 9. After the alumina tube 9 was evacuated, $N_2$-$H_2$ gas (a mixture of 66.7% nitrogen gas and 33.3% hydrogen gas) was continuously supplied into the alumina tube 9. While receiving the continuous supply of the gas mixture, the alumina tube 9 was heated to a preset temperature at a rate of 300° C./hr, and maintained at this preset temperature for 5 hours, and then cooled at a rate of 300° C./hr to room temperature. The preset temperature was set at 50° C. intervals from 100° C. to 700° C., so as to examine the effects of the heat treatment temperature on conductive and dielectric materials. After the heat treatment in the $N_2$-$H_2$ gas, the electrode layer and the dielectric layer were analyzed by X-ray powder diffraction using $CuK\alpha$ radiation.

The results were that below 150° C., no reduction of the electrode layers inside the laminate was recognized. When the laminate chip was heat treated at temperatures higher than 600° C., PbO contained in the dielectric material was reduced, resulting in deterioration in the insulation characteristic of the dielectric layer, though CuO was completely reduced to Cu. When reduced at temperatures between 200° C.-600° C., CuO of the electrode layer was reduced, but components contained in the dielectric were not reduced.

The above-described result suggests that the reduction condition is optimal at 200° C.-600° C. In this embodiment, the reduction was performed at 400° C.

During the reduction process from CuO to Cu, volume changes, but since some adhesion between the electrode layer and the dielectric layer was obtained in the previous binder burn-out process, neither delamination of the electrode layer nor cracking of the dielectric layer occurs.

Figure 4:
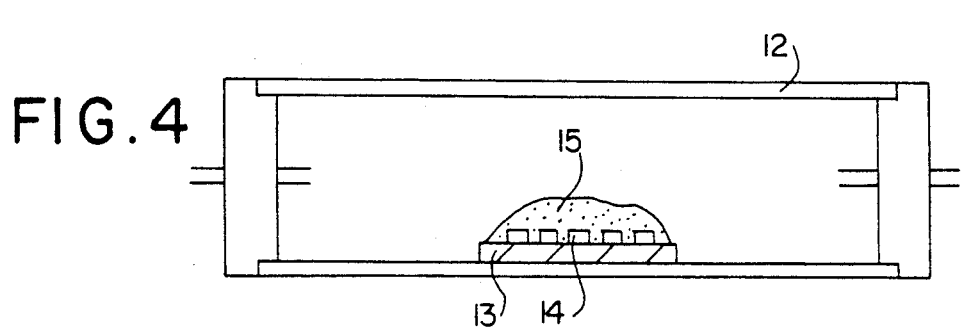
FIG. 4 is a sectional view of a tube furnace during sintering of a multi-layer ceramic capacitor of this invention.

Finally, the sintering process was executed, following the profile shown by Zone 3 in FIG. 5. Sintering was carried out using an alumina tube in an electric furnace, shown in FIG. 4. The alumina tube 12 used in the reduction process was employed in this sintering process. The laminated chip 14, which has copper internal electrode layers and the unsintered ceramic body, was placed on MgO plate 13, and then covered with pre-calcined lead magnesium niobate powder 15. After the MgO plate 13 on which the chips 14 were placed, was inserted into the alumina tube 12, the alumina tube 12 was evacuated, and then $N_2$ gas was continuously supplied into the tube 12. The alumina tube 12, supplied with $N_2$ gas (oxygen concentration 1-10 ppm), was heated to a preset temperature at a rate of 300° C./hr, and maintained at the preset temperature for 2 hours, and then cooled at a rate of 300° C./hr to room temperature. The preset sintering temperature was chosen according to the results of the EXAMPLE 1 and EXAMPLE 2. This sintering process can be carried out in an atmosphere in which copper electrodes are not re-oxidized, without delicate atmosphere control.

After this sintering process, a commercial copper paste (E. I. Du Pont #6001 copper paste) were applied at the edges of the chip capacitors as the external electrodes 3. The electric furnace used was a mesh-belt furnace of Koyo-Lindeberg Co. The firing of the external electrodes 3 was run under conditions of the peak temperature being 600° C., holding time 20 min and the time from charge-in to take-out 90 min and in a nitrogen atmosphere (oxygen concentration 1-10 ppm).

The dimensions of the resulting laminated chip capacitor were 3.2mm × 1.6mm × 0.5mm. The effective electrode area per layer was 2.468 mm² (2.35mm × 1.05mm). The thickness of the electrode layer and the dielectric ceramic layer effective dielectric ceramic layers was 10.

TABLE 6 indicates various characteristics of samples (denoted by the numerals 1-6) of multi-layer ceramic capacitors fabricated by the manufacturing method of this invention. In TABLE 6, the samples denoted with the character * relate to this invention. The samples denoted without the character * do not relate to this invention. Specifically, TABLE 6 shows the compositions of the dielectric materials, the firing temperatures, the capacitances and the dielectric losses (tan δ) of the capacitors at a temperature of 20° C., and the changes of capacitance, the resistivities of the capacitors at a temperature of 20° C., the number of the failures in the electrical destructive test of the capacitors, and the mechanical strength of the chip capacitors. The capacitance and the dielectric loss of the capacitors were measured using a LCR meter at 1 KHz with 1 Vrms. The resistivity of the capacitors was obtained using a high resistance meter, 1 minute after 50 Vdc. The temperature coefficient of the capacitance was obtained by measuring the capacitance at temperature range of $-25°$ C. to $85°$ C. The break down voltage of the capacitor was derived from the voltage at which the dielectric layers were electrically broken down, with applying dc voltage at the rate of 4.0 volt/sec. to the capacitor. The capacitor whose brake down voltage was less than 1000 V was regarded as a failure in the electrical destructive test. The number of samples subjected to this measurement was 15 per each group of samples having a same composition. The bending strength of the capacitor was measured in the following manner. The capacitor was supported at both ends thereof by two supports which are apart by 2.0 mm from each other.

TABLE 6

| No. | Dielectric Material | Firing Temperature (°C.) | Capacitance (20° C.) (nF) | tan δ (20° C.) (%) | Change of capacitance (%) | | Resistivity (20° C.) (Ω) | Number of the failure in electrical destruction test | Bending strength (kg/cm$^2$) |
| --- | --- | --- | --- | --- | --- | --- | --- | --- | --- |
| | | | | | $-25°$ C. | $85°$ C. | | | |
| 1 | A | 975 | 229 | 1.03 | $-30.4$ | $-51.4$ | $3.6 \times 10^{11}$ | 13 | 1110 |
| 2* | B | 950 | 236 | 0.97 | $-29.8$ | $-51.8$ | $5.3 \times 10^{11}$ | 0 | 1930 |
| 3* | B | 1000 | 233 | 0.99 | $-28.9$ | $-51.0$ | $4.9 \times 10^{11}$ | 0 | 1910 |
| 4* | C | 975 | 270 | 1.25 | $-42.5$ | $-54.9$ | $3.8 \times 10^{11}$ | 1 | 2150 |
| 5* | D | 975 | 199 | 2.55 | $-44.0$ | $+23.8$ | $4.4 \times 10^{11}$ | 1 | 1870 |
| 6 | E | 1000 | 113 | 3.79 | $-51.3$ | $+49.6$ | $1.0 \times 10^{11}$ | 4 | 1890 |

A pressure fixture (1mm ×6mm ×30mm, radius of tip curvature 0.5) was pressed against the capacitor at a speed of 30 mm/min. From the load at which the capacitor was broken, the bending strength of the capacitor was obtained.

From TABLE 6, it is obvious that a multi-layer ceramic capacitor of this invention exhibits high electrical resistivity high mechanical strength, and high brake down voltage. As shown in FIG. 1 the multi-layer ceramic capacitor comprises internal electrode layers 1 consisting of copper, and ceramic dielectric layers 2 extending between the internal electrode layers, the ceramic dielectric layers made of a ceramic composition comprising lead magnesium niobate, lead titanate, and copper oxide. The ceramic composition, sintered at a temperature below 1000° C., shows narrow grain size distribution and no abnormal grain growth, which results in the high mechanical strength and high brake down voltage of the multi-layer ceramic capacitor of this invention.

What is claimed is:

1. A ceramic composition comprising lead magnesium niobate $(Pb(Mg_{\frac{1}{3}}Nb_{\frac{2}{3}})O_3)$ in an amount of 75.0 to 97.0 mol % and copper oxide in an amount of 3.0 to 25.0 mol % in terms of cupric oxide (CuO).

2. A ceramic capacitor employing a ceramic composition comprising lead magnesium niobate $(Pb(Mg_{\frac{1}{3}}Nb_{\frac{2}{3}})O_3)$ in an amount of 75.0 to 97.0 mol % and copper oxide in an amount of 3.0 to 25.0 mol % in terms of cupric oxide (CuO).

3. A ceramic composition comprising lead magnesium niobate $(Pb(Mg_{\frac{1}{3}}Nb_{\frac{2}{3}})O_3)$ in an amount of 60.0 to 97.0 mol %, lead titanate $(PbTiO_3)$ in an amount of 0.0 to 15.0 mol % and copper oxide in an amount of 3.0 to 25.0 mol % in terms of cupric oxide (CuO).

4. A ceramic capacitor employing a ceramic composition comprising lead magnesium niobate $(Pb(Mg_{\frac{1}{3}}Nb_{\frac{2}{3}})O_3)$ in an amount of 60.0 to 97.0 mol %, lead titanate $(PbTiO_3)$ in an amount of 0.0 to 15.0 mol % and copper oxide in an amount of 3.0 to 25.0 mol % in terms of cupric oxide (CuO).

5. A multi-layer ceramic capacitor comprising:
(a) internal electrode layers consisting of copper; and
(b) ceramic dielectric layers extending between the internal electrode layers, the ceramic dielectric layers consisting of a ceramic composition comprising lead magnesium niobate $(Pb(Mg_{\frac{1}{3}}Nb_{\frac{2}{3}})O_3)$ in an amount of 75.0 to 97.0 mol % and copper oxide in an amount of 3.0 to 25.0 mol % in terms of cupric oxide (CuO).

6. A multi-layer ceramic capacitor comprising:
(a) internal electrode layers consisting of copper; and
(b) ceramic dielectric layers extending between the internal electrode layers, the ceramic dielectric layers consisting of a ceramic composition comprising lead magnesium niobate $(Pb(Mg_{\frac{1}{3}}Nb_{\frac{2}{3}})O_3)$ in an amount of 60.0 to 97.0 mol %, lead titanate $(PbTiO_3)$ in an amount of 0.0 to 15.0 mol % and copper oxide in an amount of 3.0 to 25.0 mol % in terms of cupric oxide (CuO).

* * * * *